(12) United States Patent
Kim

(10) Patent No.: US 8,652,666 B2
(45) Date of Patent: Feb. 18, 2014

(54) BATTERY MODULE

(75) Inventor: Myung-Chul Kim, Yongin-si (KR)

(73) Assignees: Samsung SDI Co., Ltd., Yongin-Si, Gyeonggi-Do (KR); ROBERT BOSCH GmbH, Stuttgart (DE)

( * ) Notice: Subject to any disclaimer, the term of this patent is extended or adjusted under 35 U.S.C. 154(b) by 181 days.

(21) Appl. No.: 13/206,045

(22) Filed: Aug. 9, 2011

(65) Prior Publication Data

US 2012/0270083 A1 Oct. 25, 2012

(30) Foreign Application Priority Data

Apr. 21, 2011 (KR) .................. 10-2011-0037307

(51) Int. Cl.
*H01M 2/12* (2006.01)

(52) U.S. Cl.
USPC .............................. 429/53; 429/82

(58) Field of Classification Search
USPC ............... 429/53, 72, 149–151, 175
See application file for complete search history.

(56) References Cited

U.S. PATENT DOCUMENTS

| | | | |
|---|---|---|---|
| 5,256,502 A | 10/1993 | Kump | |
| 7,351,493 B2 | 4/2008 | Uemoto et al. | |
| 2006/0093901 A1* | 5/2006 | Lee et al. | 429/120 |
| 2006/0240320 A1 | 10/2006 | Cheon et al. | |
| 2010/0119931 A1* | 5/2010 | Shishido et al. | 429/153 |

FOREIGN PATENT DOCUMENTS

| | | | | |
|---|---|---|---|---|
| EP | 1 059 679 A2 | 12/2000 | | |
| EP | 2 445 032 A1 | 4/2012 | | |
| EP | 2 450 982 A2 | 5/2012 | | |
| JP | 2002-134078 | * 5/2002 | .............. | H01M 2/10 |
| JP | 2002-134078 A | 5/2002 | | |
| JP | 2002-151025 A | 5/2002 | | |
| JP | 2009-170258 A | 7/2009 | | |
| JP | 2011-014321 | * 1/2011 | .............. | H01M 2/10 |
| JP | 2011-014321 A | 1/2011 | | |
| KR | 10-2003-0030545 A | 4/2003 | | |

OTHER PUBLICATIONS

Korean Notice of Allowance dated Oct. 29, 2012 for KR 10-2011-0037307 (Kim).

Extended European Search Report dated Aug. 30, 2012 for EP 11190847.1 (Kim).

* cited by examiner

*Primary Examiner* — Ula C Ruddock
*Assistant Examiner* — Osei Amponsah
(74) *Attorney, Agent, or Firm* — Lee & Morse, P.C.

(57) ABSTRACT

A battery module includes a plurality of battery cells aligned in one direction, each battery cell having a vent portion, and a cover covering the vent portions of the battery cells, the cover including a gas outlet at a first end of the cover, and a top surface having a gradually decreasing slope from the first end of the cover to a second end of the cover opposite the first end.

18 Claims, 4 Drawing Sheets

BATTERY MODULE

BACKGROUND

1. Field

Example embodiments relate to a battery module including a plurality of battery cells.

2. Description of the Related Art

A high-power battery module using a non-aqueous electrolyte with high energy density has recently been developed. The high-power battery module is configured as a large-capacity battery module manufactured by connecting a plurality of battery cells in series so as to be used in driving motors of devices requiring high power, e.g., electric vehicles and the like.

A battery cell includes an electrolyte and an electrode assembly composed of a positive plate and a negative electrode plate, and generates energy through an electrochemical reaction of these electrode plates and the electrolyte. Gas may be generated as a side reaction of the electrochemical reaction in the interior of the battery cell. Therefore, a battery module may be provided with a gas flow path, a gas outlet, and the like, so as to effectively treat gas generated in a plurality of battery cells.

SUMMARY

Embodiments are directed to a battery module capable of easily controlling gas generated from a plurality of battery cells.

According to an example embodiment, a battery module may include a plurality of battery cells aligned in one direction, each battery cell having a vent portion, and a cover covering the vent portions of the battery cells, the cover including a gas outlet at a first end of the cover, and a top surface having a gradually decreasing slope from the first end of the cover to a second end of the cover opposite the first end.

The battery module may further include at least one rib on the top surface of the cover.

A bottom surface of the rib may be facing the top surface of the cover and is configured to compensate for the slope of the top surface of the cover, a top surface of the rib being parallel with a bottom surface of the cover.

The rib may have a gradually increasing height from the first end of the cover toward the second end of the cover, a distance between a top surface of the rib and a bottom surface of the cover being constant.

The battery module may further include at least one reinforcing member on the top surface of the cover and intersecting the at least one rib.

The cover may have a hexahedral shape with an opening in a bottom surface, the bottom surface of the cover being opposite the top surface and facing the vent portions.

The cover may define a gas flow path in fluid communication with the gas outlet and vent portions of the battery cells, the gas path being enclosed between the cover and the battery cells.

The battery module may further include an insulating member on the vent portions, the insulating member being between the cover and the battery cells.

The insulating member may be a single body overlapping the entire cover and vent portions.

The insulating member may have a plurality of openings at regions corresponding to the vent portions.

The insulating member may include a heat-resistant material.

The insulating member may be a gasket.

The battery module may further include a housing configured to accommodate the plurality of battery cells.

The housing may include a pair of end plates spaced apart from each other, the plurality of battery cells being positioned between the end plates, and at least one connecting member connecting the pair of the end plates to each other.

The connecting member may include side brackets connecting side surfaces of the pair of the end plates, and a bottom bracket connecting bottom surfaces of the end plates.

The cover may have a gradually decreasing height from the first end toward the second end, the height being measured along a direction normal to a plane of the vent portions.

The top surface of the cover may face away from the vent portions and overlap all the vent portions.

The battery module may further include an insulating member between the cover and the vent portions, the insulating member being directly attached to the cover, and the cover having a hollow interior in fluid communication with the vent portions through openings in the insulating member.

The top surface of the cover may be sloped at a constant angle.

The battery module may further include a sloped rib on the top surface of the cover, the rib being sloped at the constant angle and positioned to complement the slope of the top surface of the cover.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
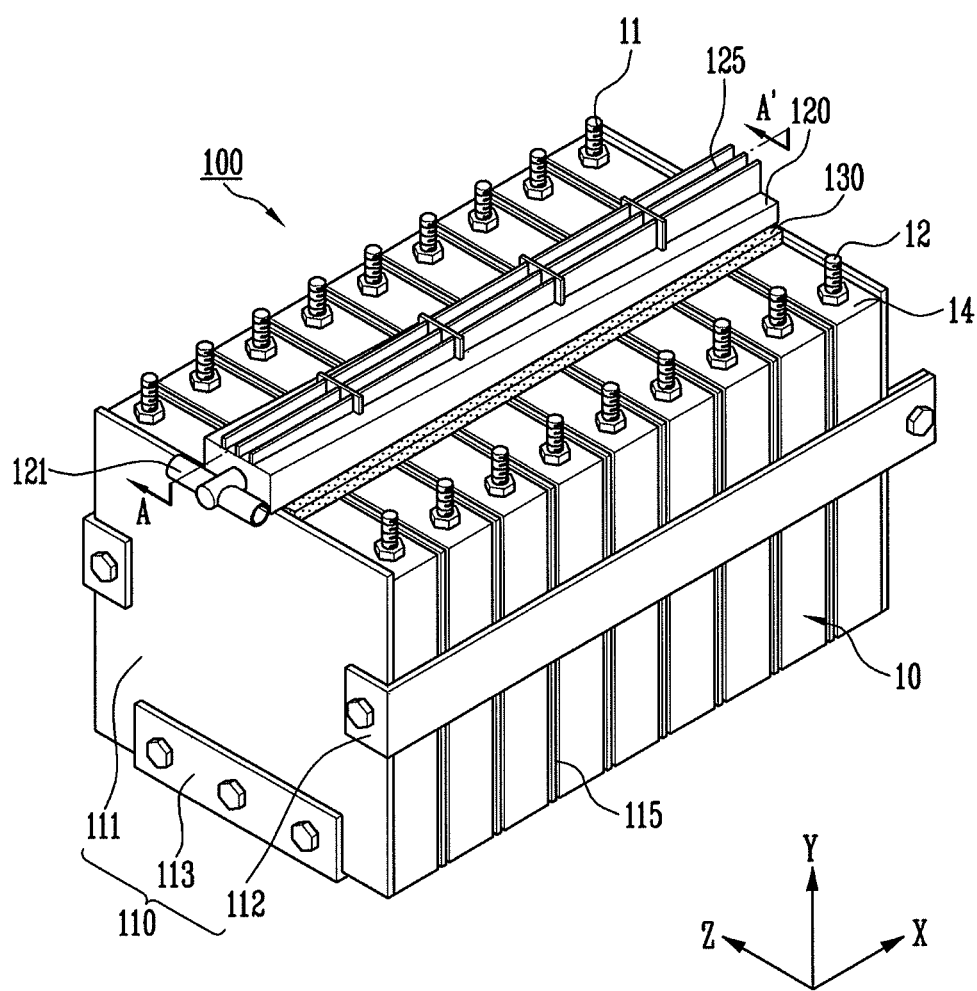
FIG. 1 illustrates a perspective view of a battery module according to an embodiment.

Korean Patent Application No. 10-2011-0037307, filed on Apr. 21, 2011, in the Korean Intellectual Property Office, and entitled: "Battery Module" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer (or element) is referred to as being "on" another layer or substrate, it can be directly on the other layer or substrate, or intervening layers (or elements) may also be present. In addition, it will also be understood that when a layer (or element) is referred to as being "between" two layers, it can be the only layer between the two layers, or one or more intervening layers (elements) may also be present. Like reference numerals refer to like elements throughout.

Hereinafter, exemplary embodiments will be described with reference to FIGS. 1-4.

Figure 2:
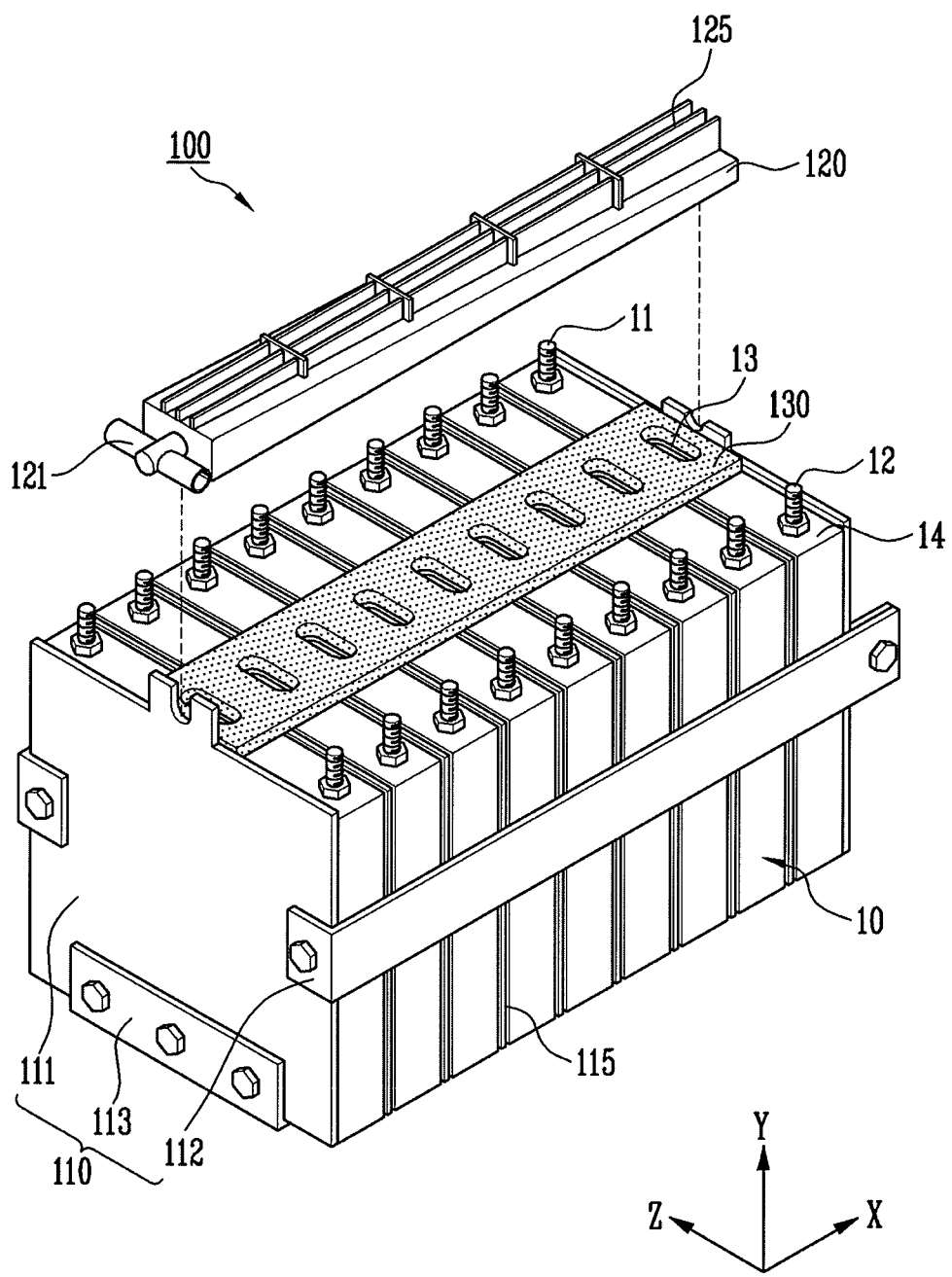
FIG. 2 illustrates an exploded perspective view of the battery module in FIG. 1.
Figure 3A:
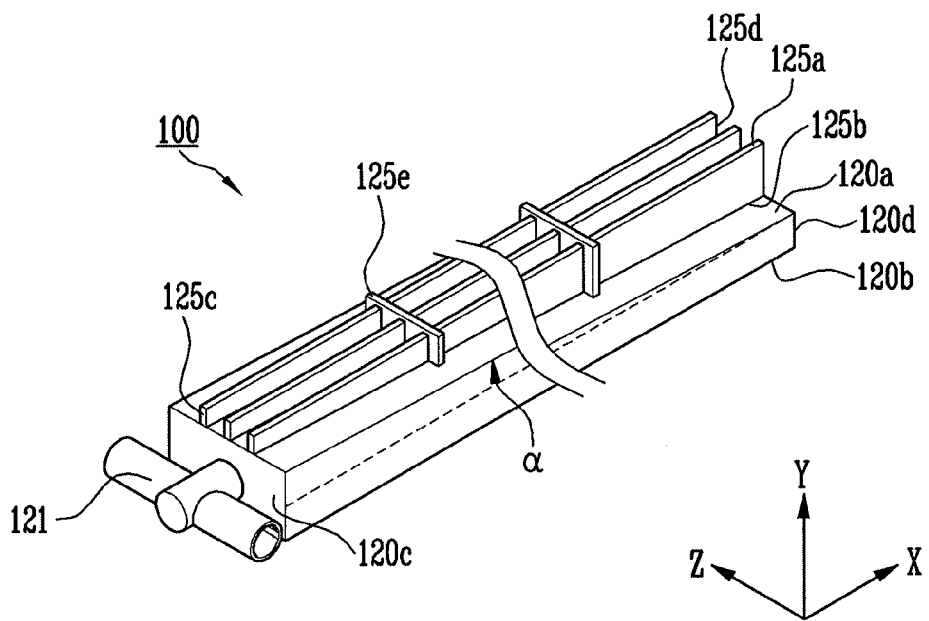
FIG. 3A illustrates an enlarged perspective view of a cover in the battery module of FIG. 1.
Figure 3B:
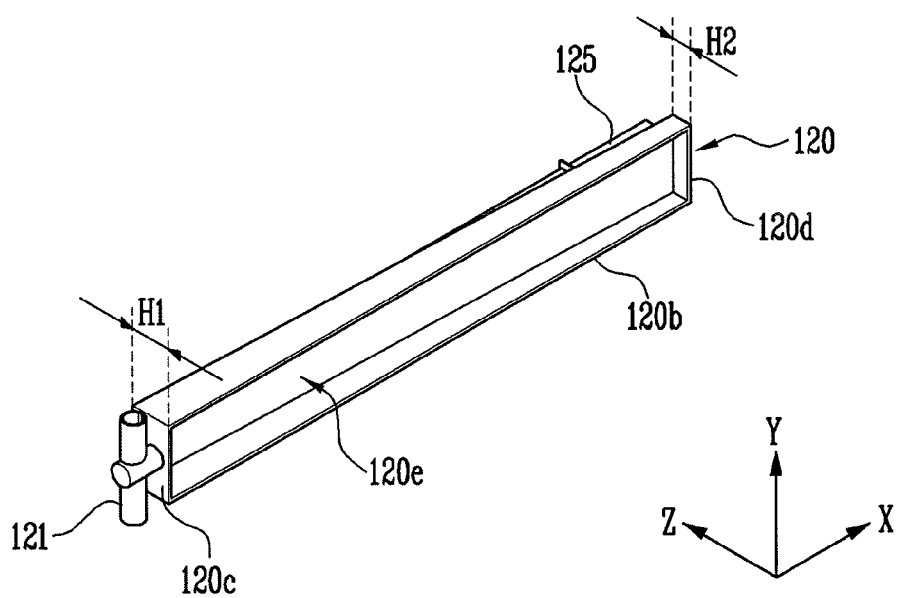
FIG. 3B illustrates a perspective view of the cover in FIG. 3A, when it is rotated about the x-axis.
Figure 4:
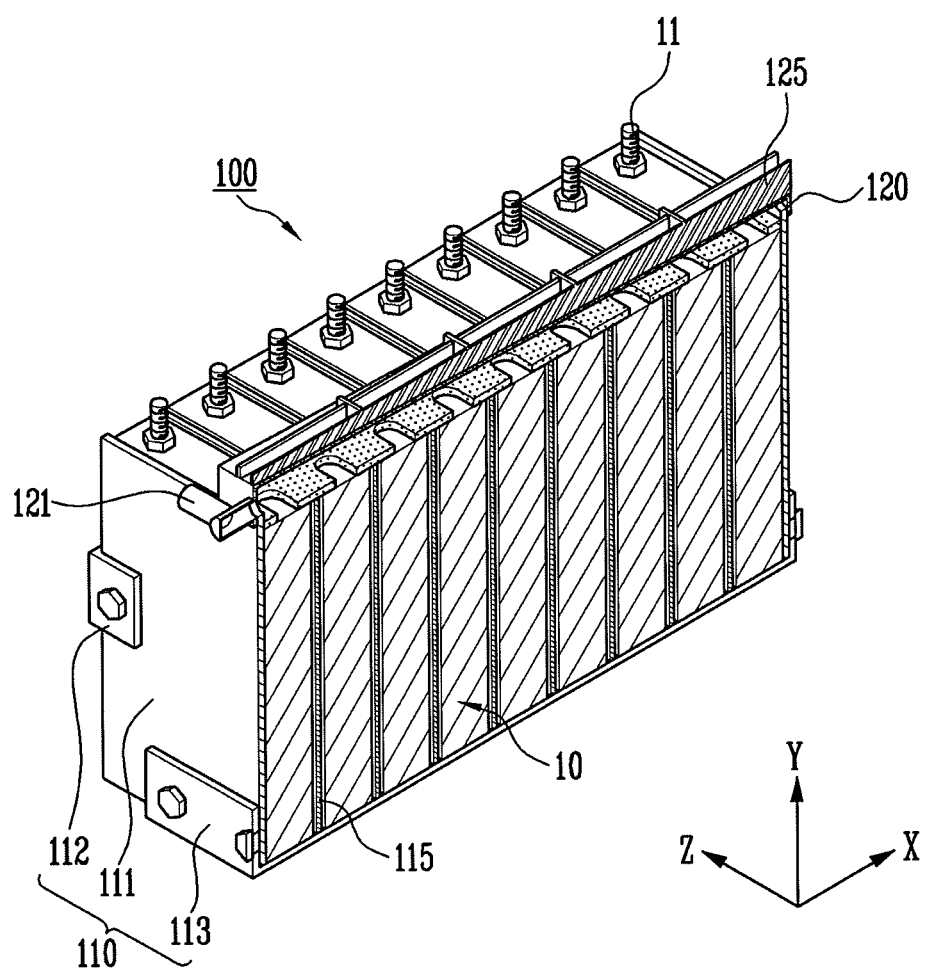
FIG. 4 illustrates a cross-sectional view taken along line A-A' of FIG. 1.

FIG. 1 is a perspective view of a battery module according to an embodiment. FIG. 2 is an exploded perspective view of the battery module in FIG. 1. FIG. 3A is an enlarged perspective view of a cover in FIG. 1. FIG. 3B is a perspective view of a left-rotated cover of FIG. 1. FIG. 4 is a cross-sectional view along line A-A' of FIG. 1.

Referring to FIGS. 1-2, a battery module 100 according to an embodiment may include a plurality of battery cells 10, e.g., each battery cell 10 having a vent portion 13, aligned in one direction, and a cover 120 that covers the vent portions 13. As illustrated in FIG. 3A, the battery module 100 may further include a gas outlet 121 provided at a first end 120c of the cover 120. As further illustrated in FIG. 3A, a top surface 120a of the cover 120 may be sloped, i.e., have a decreasing, e.g., gradually decreasing, slope α, from the first end 120c of the cover 120 toward a second end 120d, i.e., an end positioned opposite to the first end 120c, of the cover 120 (see slope a of the top surface 120a relative to the dashed line in FIG. 3A). As such, as illustrated in FIG. 3B, a height of the cover 120 along the y-axis may gradually, i.e., evenly and slowly, decrease, so a height H1 of the cover 120 along the y-axis at the first end 120c may be larger than a height H2 of the cover 120 along the y-axis at the second end 120d. For example, the cover 120 may be sloped at a constant angle. It is noted that the heights H1, H2, as well as the slope of the top surface, are determined relative to a plane supporting the battery module 100, e.g., relative to the bottom surface 120b of the cover 120.

At least one rib 125 may be formed on the top surface 120a of the cover 120, e.g., the rib 125 may extend along the x-axis on the top surface 120a of the cover 120. A bottom surface 125b of the rib 125 may be formed to compensate for, e.g., complement, the slope of the top surface 120a of the cover 120. That is, contrary to the slope of the cover 120, the bottom surface 125b of the rib 125 may have a gradually increasing slope from a first end 125c to a second end 125d, i.e., an end opposite the first end 125c. In other words, a height of the rib 125 along the y-axis may gradually increase, i.e., the height of the rib 125 along the y-axis at the first end 125c may be smaller than the height of the rib 125 along the y-axis at the second end 125d. As such, the bottom surface 125b of the rib 125 may be formed to compensate for the slope of the top surface 120a of the cover 120, so that a top surface 125a of the rib 125 and a bottom surface 120b of the cover 120 are parallel with each other. That is, the slopes of the cover 120 and rib 125 may be at a substantially same angle but opposite directions, so a distance between the top surface 125a of the rib 125 and the bottom surface 120b of the cover 120 may remain constant.

As described above, the rib 125 is formed to compensate for a low slope at portion of the cover 120 of which the slope is low, thereby enduring high pressure in exhaustion of gas. Further, as the rib 125 imparts a flat structure to the cover 120, i.e., as an overall combined structure of the rib 125 with the cover 120 is hexahedral without irregularities, in a case where a plurality of battery modules 100 is vertically arranged, it may be possible to facilitate coupling between adjacent battery modules 100 as all the battery modules 100 may have a substantially same flat shape.

Meanwhile, a reinforcing member 125e perpendicular to a length direction of the rib 125 may be further formed on the top surface 120a of the cover 120. The reinforcing member 125e may be disposed to intersect a plurality of ribs 125 arranged at a predetermined interval, thereby reinforcing the rigidity of the ribs 125.

Referring to FIGS. 3B and 4, the cover 120 may be formed in a shape of a hexahedron having an open bottom surface 120b. In other words, as illustrated in FIG. 3B, the bottom surface 120b may be a lowermost edge of the cover 120 that defines, e.g., a rectangular, frame around a, e.g., rectangular, opening 120e. The cover 120 may be mounted on the battery cells 10, so that the open bottom surface 120b of the cover 120, i.e., the opening 120e, faces the vent portions 13. Here, the cover 120 may form a gas flow path connected to the gas outlet 121 by coming in close contact with the battery cells 10.

According to this embodiment, the cover 120 is formed to have a slope, so the slope is formed in a space in which the gas flow path is formed. Accordingly, gas can be effectively and rapidly exhausted through the sloped cover 120. As the rib 125 is formed with a slope to compensate for the slope of the cover 120, the entire battery module 100 is flat, i.e., without a slope. Accordingly, in a case where a plurality of battery modules 100 is vertically arranged, it may be possible to facilitate coupling between the battery modules 100.

Referring back to FIGS. 1-2, the battery module 100 according to this embodiment may further include an insulating member 130 correspondingly positioned on the region of the vent portions 13 between the cover 120 and the battery cells 10. For example, the cover 120 may be formed in a shape approximately corresponding to the insulating member 130 which will be described later. As described above, the cover 120 that covers the insulating member 130 may form a flow path of gas by coming in close contact with the insulating member 130. The gas outlet 121 connected to the gas flow path, so as to exhaust gas to the outside of the battery module 100, may be further provided at the one end of the cover 120.

As the charging/discharging of the battery cell 10 is performed, gas may be generated due to by-products of electrode plates and an electrolyte, and the generated gas may be exhausted through the vent portion 13. The gas is exhausted through the gas outlet 121 provided to the cover 120, and the gas outlet 121 may be formed in a T-shape. Specifically, the T-shaped gas outlet 121 may protrude from the first end 120c of the cover 120, so left and right sides of the gas outlet 121 are open to be perpendicular to the length direction of the cover 120. Thus, the gas exhausted through the gas outlet 121 may be exhausted to the left and right sides, i.e., through the left and right sides of the T-shapes gas outlet 121, in parallel with an end plate 111. Accordingly, the exhausted gas through the gas outlet 121 has no influence on, i.e., sufficiently spaced from, an adjacent battery module 100.

As illustrated in FIG. 1, in the battery pack 100 according to this embodiment, a width of the insulating member 130, e.g., along the z-axis, may be wider than that of the cover 120. In a case where the width of the insulating member 130 is narrower than that of the cover 120, the contact between the cover 120 and the insulating member 130 may be insufficient, e.g., not sufficiently tight, thereby causing potential gas leaks between the insulating member 130 and the cover 120.

The insulating member 130 may be provided with a plurality of openings respectively formed at portions corresponding to the vent portions 13, and may be formed in a single body. For example, the insulating member 130 may be a gasket made of a heat-resistance material so as to prevent leakage of gas. If the insulating member 130 is not made of a heat-resistant material, as the charging/discharging of the battery cell 10 is performed and heat is generated from the battery cell 10, the plurality of battery cells 10 may discharge high-temperature heat to surroundings thereof, thereby melting the insulating member 130 mounted on the battery cells 10. In a case where the insulating member 130 is melted, the exhausted gas may leak due to a decrease in the sealing between the insulating member 130 and the cover 120.

The insulating member 130 facilitates a tight assembly and connection between the battery cells 10 and the cover 120. For example, if an outer case of the battery cell 10 is formed of a metal and the cover 120 is formed of a plastic resin, direct contact between the battery cell 10 and the cover 120, i.e., without the insulating member 130, may be insufficiently tight, i.e., the contact may be not easily performed, because the battery cell 10 and the cover 120 are formed of different kinds of materials. Further, the gas may leak through a portion at which the contact is weak. In order to prevent such a problem, a gasket, i.e., the insulating member 130, may be provided between the battery cells 10 and the cover 120, thereby providing an improved sealing property between the battery cells 10 and the cover 120.

In a case where the insulating member 130 is provided in a single body, the plurality of vent portions of the plurality of battery cells 10 can be simultaneously sealed by the insulating member 130. In this instance, the plurality of openings respectively corresponding to the vent portions 13 may be provided to the insulating member 130.

Referring to FIGS. 1-2, the battery cell 10 may include a battery case provided with an opening and a cap plate 14 that seals the opening. The battery case accommodates an electrode assembly and an electrolyte. The electrode assembly may include a positive electrode plate, a negative electrode plate, and a separator interposed between these electrode plates. Positive and negative electrode terminals 11 and 12 connected to the positive and negative electrode plates are provided at both ends of the cap plate 14, respectively. The positive and negative electrode terminals 11 and 12 may protrude to the outside of the battery cell 10 from the cap plate 14. The positive and negative electrode plates that constitute the electrode assembly generate energy through a reaction between the electrode assembly and the electrolyte, and the energy is transferred to the outside of the battery cell 10 through the positive and negative electrode terminals 11 and 12.

The vent portion 13 may be provided between the positive and negative electrode terminals 11 and 12 of the cap plate 14. The vent portion 13 serves as a path through which gas generated in the inside of the battery cell 10 is exhausted from the battery cell 10 when the pressure of the gas is a predetermined value or more. Thus, the vent portion 13 can prevent the battery cell 10 from being broken by an internal pressure.

In this embodiment, the plurality of battery cells 10 may be aligned in one direction. In this instance, the battery cells 10 are aligned in parallel with one another, so that wide font surfaces of the battery cells 10 are opposite to each other. For example, the vent portion 13 may be provided at a central portion of each of the battery cells 10, and the vent portions 13 may be approximately aligned on a straight line. The positive and negative electrode terminals 11 and 12 of neighboring battery cells 10 may be electrically connected to each other through a bus-bar (not shown) formed of nickel or the like.

A housing 110 may include a pair of end plates 111 provided to be spaced apart from each other in one direction, and a plurality of connecting members that connect the pair of the end plates 111 to each other. The connecting member may include side brackets 112 that connect side surfaces of the end plates 111, and a bottom bracket 113 that connects the bottom surfaces of the end plates 111. The plurality of battery cells 10 may be accommodated between the pair of the end plates 111.

The pair of the end plates 111 is provided to come in surface contact with outermost battery cells 10, respectively. Thus, the pair of the end plates 111 apply pressure to the inside of the plurality of battery cells 10. The side brackets 112 are connected to one and the other ends of the pair of the end plates 111 so as to support both side surfaces of the plurality of battery cells 10. In this instance, the bottom surfaces of the battery cells 10 may be supported by the bottom bracket 113, and both ends of the bottom bracket 113 are connected to the plurality of the end plates 111, respectively.

The plurality of the battery cells 10 supported by the end plates 111, the side brackets 112 and the bottom bracket 113 may be aligned so that the positive and negative electrode terminals 11 and 12 are alternately provided in the inside of the housing 110. In this case, the plurality of battery cells 10 may be connected in series to one another using the bus-bars. The connection structure and number of the battery cells 10 may be variously modified depending on a design of the battery module 100.

A barrier 115 may be interposed between neighboring battery cells 10. A spacer (not shown) is provided to the barrier 115 so as to space apart the neighboring battery cells 10 from each other and to form a space between the battery cells 10. Thus, it is possible to provide the movement path of a coolant for cooling the battery cells 10.

According to this embodiment, the cover of the battery module is formed to have a slope, so that a slope is also formed in the space in which the gas flow path is formed. Accordingly, the gas can be effectively and rapidly exhausted through the sloped gas flow path. Although the cover has a slope, a rib is formed so as to compensate for the slope formed at the cover, thereby enduring high pressure in exhaustion of gas. Thus, the entire battery module is flat without a slope. Accordingly, in a case where a plurality of battery modules is vertically arranged, it is possible to facilitate coupling between the battery modules.

As described above, according to embodiments, it may be possible to provide a battery module in which a slope is formed in a space in which a gas flow path is formed, so that gas can be effectively and rapidly exhausted. Further, it may be possible to provide a battery module having improved productivity, while effectively controlling gas generated from a plurality of battery cells through a simplified working process.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A battery module, comprising:
   a plurality of battery cells aligned in one direction, each battery cell having a vent portion;
   a cover covering the vent portions of the battery cells, the cover including:
      a gas outlet at a first end of the cover, and
      a top surface having a slope extending from the first end of the cover to a second end of the cover opposite the first end; and
   at least one rib on the top surface of the cover, the rib having an increasing height from the first end of the cover toward the second end of the cover, a distance between a top surface of the rib and a bottom surface of the cover being constant.

2. The battery module as claimed in claim 1, wherein a bottom surface of the rib faces the top surface of the cover and is configured to compensate for the slope of the top surface of the cover, a top surface of the rib being parallel with a bottom surface of the cover.

3. The battery module as claimed in claim 1, further comprising at least one reinforcing member on the top surface of the cover and intersecting the at least one rib.

4. The battery module as claimed in claim 1, wherein the cover has a hexahedral shape with an opening in a bottom surface, the bottom surface of the cover being opposite the top surface and facing the vent portions.

5. The battery module as claimed in claim 4, wherein the cover defines a gas flow path in fluid communication with the gas outlet and vent portions of the battery cells, the gas flow path being enclosed between the cover and the battery cells.

6. The battery module as claimed in claim 1, further comprising an insulating member on the vent portions, the insulating member being between the cover and the battery cells.

7. The battery module as claimed in claim 6, wherein the insulating member is a single body overlapping the entire cover and vent portions.

8. The battery module as claimed in claim 6, wherein the insulating member has a plurality of openings at regions corresponding to the vent portions.

9. The battery module as claimed in claim 6, wherein the insulating member includes a heat-resistant material.

10. The battery module as claimed in claim 6, wherein the insulating member is a gasket.

11. The battery module as claimed in claim 1, further comprising a housing configured to accommodate the plurality of battery cells.

12. The battery module as claimed in claim 11, wherein the housing includes:
- a pair of end plates spaced apart from each other, the plurality of battery cells being positioned between the end plates; and
- at least one connecting member connecting the pair of the end plates to each other.

13. The battery module as claimed in claim 12, wherein the connecting member includes side brackets connecting side surfaces of the pair of the endplates, and a bottom bracket connecting bottom surfaces of the end plates.

14. The battery module as claimed in claim 1, wherein the cover has a gradually decreasing height from the first end toward the second end, the height being measured along a direction normal to a plane of the vent portions.

15. The battery module as claimed in claim 1, wherein the top surface of the cover faces away from the vent portions and overlaps all the vent portions.

16. The battery module as claimed in claim 15, further comprising an insulating member between the cover and the vent portions, the insulating member being directly attached to the cover, and the cover having a hollow interior in fluid communication with the vent portions through openings in the insulating member.

17. The battery module as claimed in claim 1, wherein the top surface of the cover is sloped at a constant angle.

18. The battery module as claimed in claim 17, further comprising a sloped rib on the top surface of the cover, the rib being sloped at the constant angle and positioned to complement the slope of the top surface of the cover.

* * * * *